(12) United States Patent
Mamyoda

(10) Patent No.: US 7,129,669 B2
(45) Date of Patent: Oct. 31, 2006

(54) MOTOR CONTROLLER, SEMICONDUCTOR INTEGRATED CIRCUIT, INDICATING INSTRUMENT AND METHOD FOR CONTROLLING A MOTOR

(75) Inventor: Yutaka Mamyoda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/745,517

(22) Filed: Dec. 29, 2003

(65) Prior Publication Data

US 2004/0189237 A1 Sep. 30, 2004

(30) Foreign Application Priority Data

Jan. 30, 2003 (JP) ............... P2003-022681

(51) Int. Cl.
H02G 8/00 (2006.01)
H02G 6/16 (2006.01)

(52) U.S. Cl. .............. 318/685; 318/145; 318/459; 318/248; 318/363; 318/368; 318/696; 310/49; 116/289; 116/291; 116/201

(58) Field of Classification Search ........... 318/696, 318/685, 145, 459, 248, 363, 368; 116/284, 116/289, 291, 201; 310/49
See application file for complete search history.

(56) References Cited

U.S. PATENT DOCUMENTS

| 4,878,453 A | * | 11/1989 | Inoue et al. | ............ | 116/288 |
|---|---|---|---|---|---|
| 4,973,896 A | * | 11/1990 | Shiga et al. | ............ | 322/28 |
| 5,032,781 A | * | 7/1991 | Kronenberg | ............ | 318/696 |
| 5,287,050 A | * | 2/1994 | Kronenberg et al. | ............ | 318/696 |
| 5,333,371 A | * | 8/1994 | Mittenbuhler et al. | ............ | 29/595 |
| 5,424,960 A | * | 6/1995 | Watanabe et al. | ............ | 702/41 |
| 5,521,475 A | * | 5/1996 | Fu et al. | ............ | 318/459 |
| 5,723,964 A | * | 3/1998 | Nakaba | ............ | 318/599 |
| 5,869,944 A | * | 2/1999 | Tanina | ............ | 318/599 |
| 5,973,491 A | * | 10/1999 | Onizuka et al. | ............ | 363/124 |
| 6,014,075 A | * | 1/2000 | Fujimori et al. | ............ | 340/461 |
| 6,326,760 B1 | * | 12/2001 | Cardoletti et al. | ............ | 318/700 |
| 6,335,604 B1 | * | 1/2002 | Kataoka | ............ | 318/609 |
| 6,410,863 B1 | * | 6/2002 | Cappiello | ............ | 177/25.13 |
| 6,476,579 B1 | * | 11/2002 | Akahane et al. | ............ | 318/696 |
| 2002/0014104 A1 | | 2/2002 | Komura et al. | | |
| 2002/0071670 A1 | * | 6/2002 | Odaka et al. | ............ | 396/206 |
| 2002/0185926 A1 | | 12/2002 | King et al. | | |
| 2003/0065486 A1 | * | 4/2003 | Sumida et al. | ............ | 702/189 |
| 2003/0128009 A1 | * | 7/2003 | Sakurai et al. | ............ | 318/722 |
| 2004/0080291 A1 | * | 4/2004 | Inoue et al. | ............ | 318/254 |
| 2004/0189237 A1 | * | 9/2004 | Mamyoda | ............ | 318/685 |
| 2004/0227619 A1 | * | 11/2004 | Watanabe | ............ | 340/10.34 |
| 2004/0252526 A1 | * | 12/2004 | Amei | ............ | 363/18 |

FOREIGN PATENT DOCUMENTS

| EP | 0736961 | 10/1995 |
|---|---|---|
| FR | 2795885 | 1/2001 |
| JP | 10-136692 | 5/1998 |

* cited by examiner

Primary Examiner—Tyrone Smith
Assistant Examiner—Lincoln Donovan
(74) Attorney, Agent, or Firm—Oblon, Spivak, McClelland, Maier & Neustadt, P.C.

(57) ABSTRACT

A motor controller comprising, a detector configured to perform a difference processing for information relating to a counter electromotive force and an induced electromotive force generated by a stepping motor, and to generate a driving control signal based on a result of the difference processing, and a driver configured to drive the stepping motor based on the driving control signal.

7 Claims, 15 Drawing Sheets

| DRIVE STATE | A | B | C | D | E |
|---|---|---|---|---|---|
| DRIVE ANGLE | 0° | -90° | -180° | -270° | -360° |
| COS+ | | | | | |
| COS- | | | | | |
| SIN+ | | | | | |
| SIN- | | | | | |

MOTOR CONTROLLER, SEMICONDUCTOR INTEGRATED CIRCUIT, INDICATING INSTRUMENT AND METHOD FOR CONTROLLING A MOTOR

CROSS REFERENCE TO RELATED APPLICATIONS

This application is based upon and claims the benefit of priority from prior Japanese Patent Application P2003-022681 filed on Jan. 30, 2003; the entire contents of which are incorporated by reference herein.

BACKGROUND OF THE INVENTION

1. Field of the Invention

The present invention relates to an indicating instrument, and more particularly to a motor controller for controlling a stepping motor used in the indicating instrument, a semiconductor integrated circuit used in the motor controller and a method for controlling the stepping motor.

2. Description of the Related Art

Since a stepping motor operates with high precision and is inexpensive, the stepping motor is widely used in an indicating instrument such as a speedometer for displaying the speed of an automobile and a tachometer for displaying the number of revolutions of an engine. In the indicating instrument such as the speedometer and the tachometer, a pointer of the indicating instrument may be incapable of a precise indication due to vibrations of a vehicle, step-out of the stepping motor and the like. Therefore, for example, in the speedometer, a zero position bar for positioning the pointer to indicate zero (hereinafter simply referred to as "a zero position"), that is, for fixing the pointer at a position indicating that the speed per hour is 0 Km/h. By measuring voltage values of induced electromotive forces generated by the stepping motor, both when the pointer of the stepping motor makes contact with the zero position bar and when the pointer does not make contact with the zero position bar, a technique for detecting the zero position is known.

The induced electromotive forces are measured at a drive angle at which the stepping motor does not need to be driven. Moreover, one end of an inductor in the stepping motor is configured to go to a high-impedance state during the driving of the stepping motor, and the voltage value derived from the induced electromotive force is measured after generation of a counter electromotive force. Accordingly, it is impossible to detect the zero position while a drive angle requiring the driving of the stepping motor and the counter electromotive force is generated. As described above, because conditions in which the zero position can be detected are limited, it has been difficult to detect the zero position with high precision.

SUMMARY OF THE INVENTION

A first aspect of the present invention inheres in a motor controller encompassing, a detector configured to perform a difference processing for information relating to a counter electromotive force and an induced electromotive force generated by a stepping motor, and to generate a driving control signal based on a result of the difference processing, and a driver configured to drive the stepping motor based on the driving control signal.

A second aspect of the present invention inheres in a indicating instrument encompassing, a stepping motor, a pointer rotatively driven by the stepping motor, a detector configured to perform a difference processing for information relating to a counter electromotive force and an induced electromotive force generated by the stepping motor, and to generate a driving control signal based on a result of the difference processing, and a driver configured to drive the stepping motor based on the driving control signal.

A third aspect of the present invention inheres in a semiconductor integrated circuit encompassing, a semiconductor chip, a detector integrated on the semiconductor chip and configured to perform a difference processing for information relating to a counter electromotive force and an induced electromotive force generated by a stepping motor, and to generate a driving control signal based on a result of the difference processing, and a driver integrated on the semiconductor chip and configured to drive the stepping motor based on the driving control signal.

A fourth aspect of the present invention inheres in a method for controlling motor encompassing, performing a difference processing for information relating to a counter electromotive force and an induced electromotive force generated by a stepping motor, generating a driving control signal based on a result of the difference processing, and driving the stepping motor based on the driving control signal.

BRIEF DESCRIPTION OF THE DRAWINGS

FIGS. 12A to 12D are drawings showing the principle of the motor controller according to the third embodiment of the present invention;

DETAILED DESCRIPTION OF EMBODIMENTS

Figure 1:
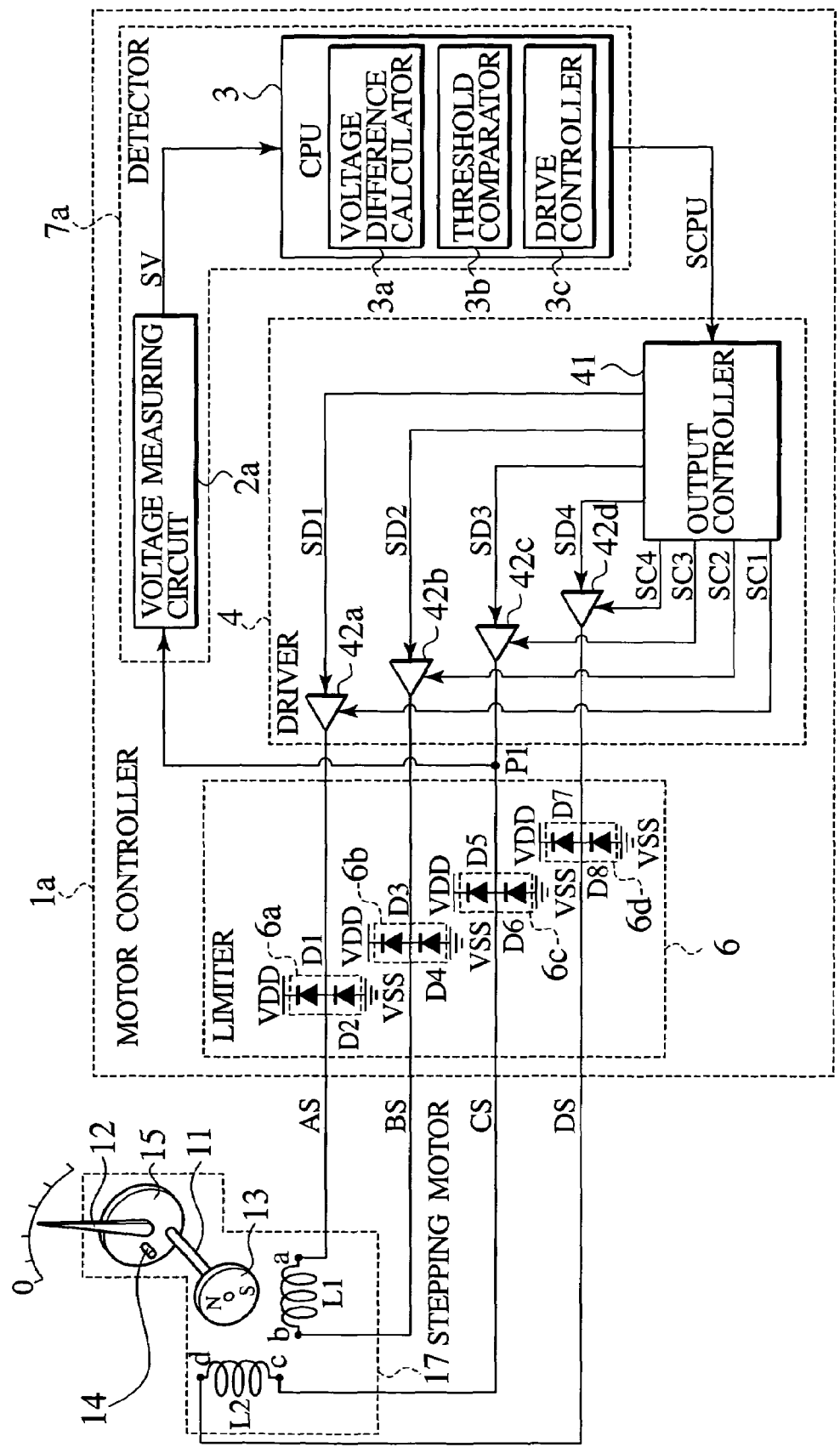
FIG. 1 is a block diagram showing an indicating instrument according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

First Embodiment

As shown in FIG. 1, an indicating instrument according to a first embodiment of the present invention includes a stepping motor 17, a pointer 12 rotatively driven by the stepping motor 17, and a motor controller 1a connected to the stepping motor 17. The motor controller 1a includes a limiter 6 connected to the stepping motor 17, a driver 4 connected to the limiter 6, and a detector 7a connected between the driver 4 and a node P1 disposed between the limiter 6 and the driver 4. The detector 7a performs a difference processing for information relating to a combined force of a counter electromotive force and induced electromotive force, which are generated by the stepping motor 17. The detector 7a generates a driving control signal SCPU based on a result of the difference processing. The driver 4 drives the stepping motor 17 based on the driving control signal SCPU. The limiter 6 controls the counter electromotive force generated by the stepping motor 17. Note that the "counter electromotive force" refers to power generated by energy stored in inductors L1 and L2 within the stepping motor 17. Note that the "induced electromotive force" refers to power generated by electromagnetic induction within the stepping motor 17.

As shown in FIG. 1, the detector 7a includes a voltage measuring circuit 2a, and a central processing unit (CPU) 3 connected to the voltage measuring circuit 2a. An analog/digital (A/D) converter, for example, can be used for the voltage measuring circuit 2a. The voltage measuring circuit 2a measures the respective voltage values of the counter electromotive force and the induced electromotive force generated by the stepping motor 17. The CPU 3 determines a voltage difference between the voltage value of the counter electromotive force and the voltage value of the induced electromotive force, and compares the voltage difference with a first threshold Vth.

The stepping motor 17 includes the first and second inductors L1 and L2, and a dipole rotator 13 rotatively driven by the first and second inductors L1 and L2. Furthermore, the stepping motor 17 includes a shaft 11 configured to transmit the rotation of the dipole rotator 13, a gear portion 15 to which power is transmitted by the shaft 11, and a zero position bar 14 configured to secure a pointer 12 at a position where the pointer 12 indicates a zero position from among a plurality of graduations. The pointer 12 indicates the position on the graduations depending on a gear ratio of the gear portion 15.

The CPU 3, as shown in FIG. 1, includes a drive controller 3c configured to control the driving of the stepping motor 17, a voltage difference calculator 3a configured to determine the voltage difference, and a threshold comparator 3b configured to compare the voltage difference and the first threshold Vth with each other. A read only memory (ROM) and a random access memory (RAM), for which illustrations are omitted, are connected to the CPU 3. The ROM serves as a program memory and the like executed in the CPU 3, while the RAM serves as a data memory and the like utilized as a storage area or a working area of data utilized during a program execution processing in the CPU 3.

The driver 4 includes a first buffer 42a connected to one end "a" of the first inductor L1, a second buffer 42b connected to the other end "b" of the first inductor L1, a third buffer 42c connected to one end "c" of the second inductor L2, a fourth buffer 42d connected to the other end "d" of the second inductor L2, and an output controller 41 connected between the CPU 3 and the first buffer 42a, the second buffer 42b, the third buffer 42c, and fourth buffer 42d. A three-state buffer can be used as the first buffer 42a, the second buffer 42b, the third buffer 42c, and the fourth buffer 42d. For example, the output controller 41 includes a driving pulse generator (the illustration is omitted) configured to generate a first driving pulse SD1, a second driving pulse SD2, a third driving pulse SD3, and a fourth driving pulse SD4 based on the driving control signal SCPU supplied from the CPU 3 and a buffer controller (the illustration is omitted) configured to generate a first switching signal SC1, a second switching signal SC2, a third switching signal SC3, and a fourth switching signal SC4. The first switching signal SC1, the second switching signal SC2, the third switching signal SC3, and the fourth switching signal SC4 supplied from the output controller 41 control the first buffer 42a, the second buffer 42b, the third buffer 42c, and the fourth buffer 42d respectively so that the buffers can select one of high level, low level and high impedance state. Furthermore, the output controller 41 controls an excitation phase such as one-phase, two-phase and one-two phase excitations of the stepping motor 17.

First, second, third, and fourth excitation signals AS, BS, CS, and DS respectively supplied from the first, second, third, and fourth buffers 42a, 42b, 42c, and 42d, are fed to the first and second inductors L1 and L2 of the stepping motor 17. The first and second ends "a" and "b" of the first inductor L1 serve respectively as either an N pole or an S pole by supplying the first and second excitation signals AS and BS to the first inductor L1. Similarly, the third and fourth ends "c" and "d" of the second inductor L2 serve respectively as either an N pole or an S pole by supplying the third and fourth excitation signals CS and DS to the second inductor L2. The dipole rotator 13 is rotated by attraction/repulsion forces between the first to fourth ends "a", "b", "c" and "d" and the dipole rotator 13.

As shown in FIG. 1, the limiter 6 includes a first limiter 6a, a second limiter 6b, a third limiter 6c, and a fourth limiter 6d. The first limiter 6a includes a first diode D1 having an anode connected to the driver 4 and a cathode connected to a high voltage power source VDD and a second diode D2 having a cathode connected to the driver 4 and an anode connected to a low voltage power source VSS. Similarly, the second limiter 6b includes a third diode D3 having an anode connected to the driver 4 and a cathode connected to the high voltage power source VDD and a fourth diode D4 having a cathode connected to the driver 4 and an anode connected to the low voltage power source VSS. The third limiter 6c includes a fifth diode D5 having an anode connected to the driver 4 and a cathode connected to the high voltage power source VDD and a sixth diode D6 having a cathode connected to the driver 4 and an anode connected to the low voltage power source VSS. The fourth limiter 6d includes a seventh diode D7 having an anode connected to the driver 4 and a cathode connected to the high voltage power source VDD and a eighth diode D8 having a cathode connected to the driver 4 and an anode connected to the low voltage power source VSS. The first diode D1, the third diode D3, the fifth diode D5, and seventh diode D7 control a positive overvoltage. On the other hand, the second diode D2, the fourth diode D4, the sixth diode D6, and eighth diode D8 control a negative overvoltage.

Next, a method for controlling a motor according to the first embodiment of the present invention will be described by using FIGS. 1 to 4.

Figure 2:
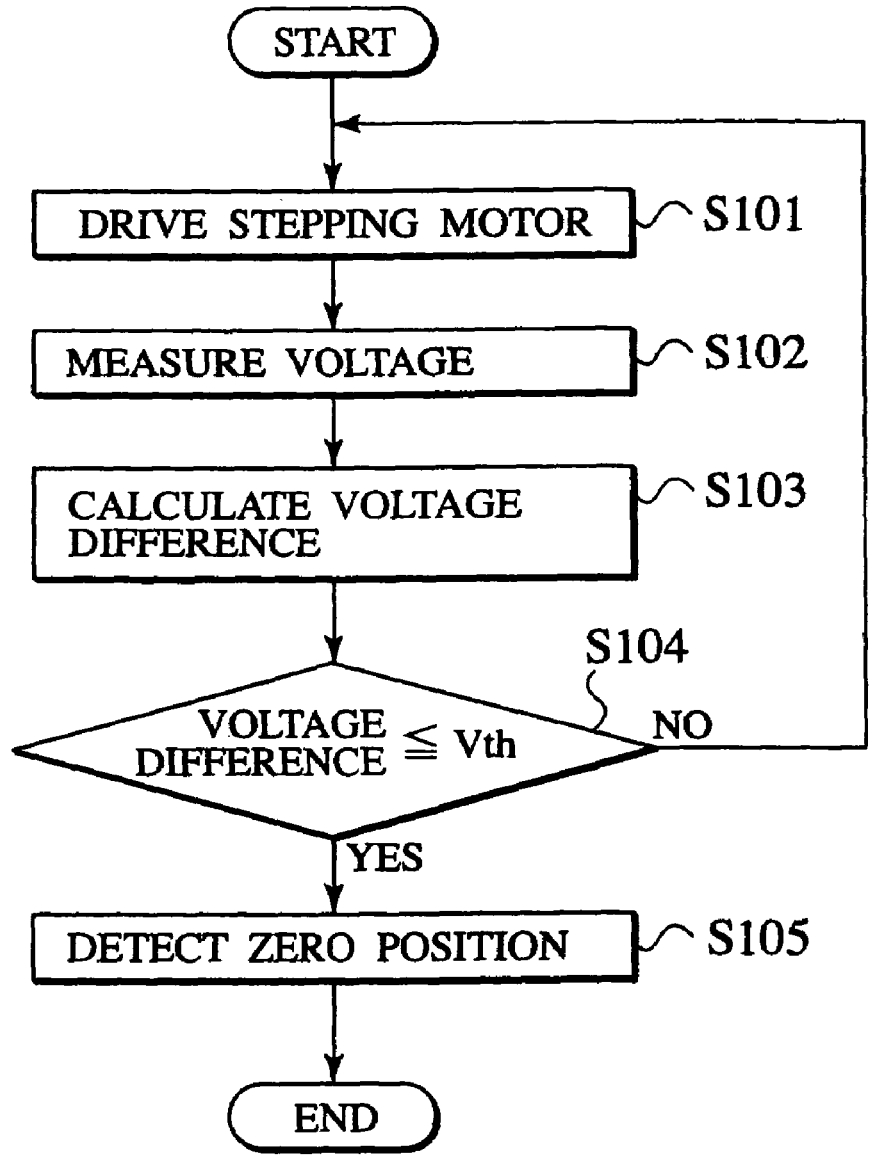
FIG. 2 is a flowchart showing a motor control method according to the first embodiment of the present invention.
Figure 3:
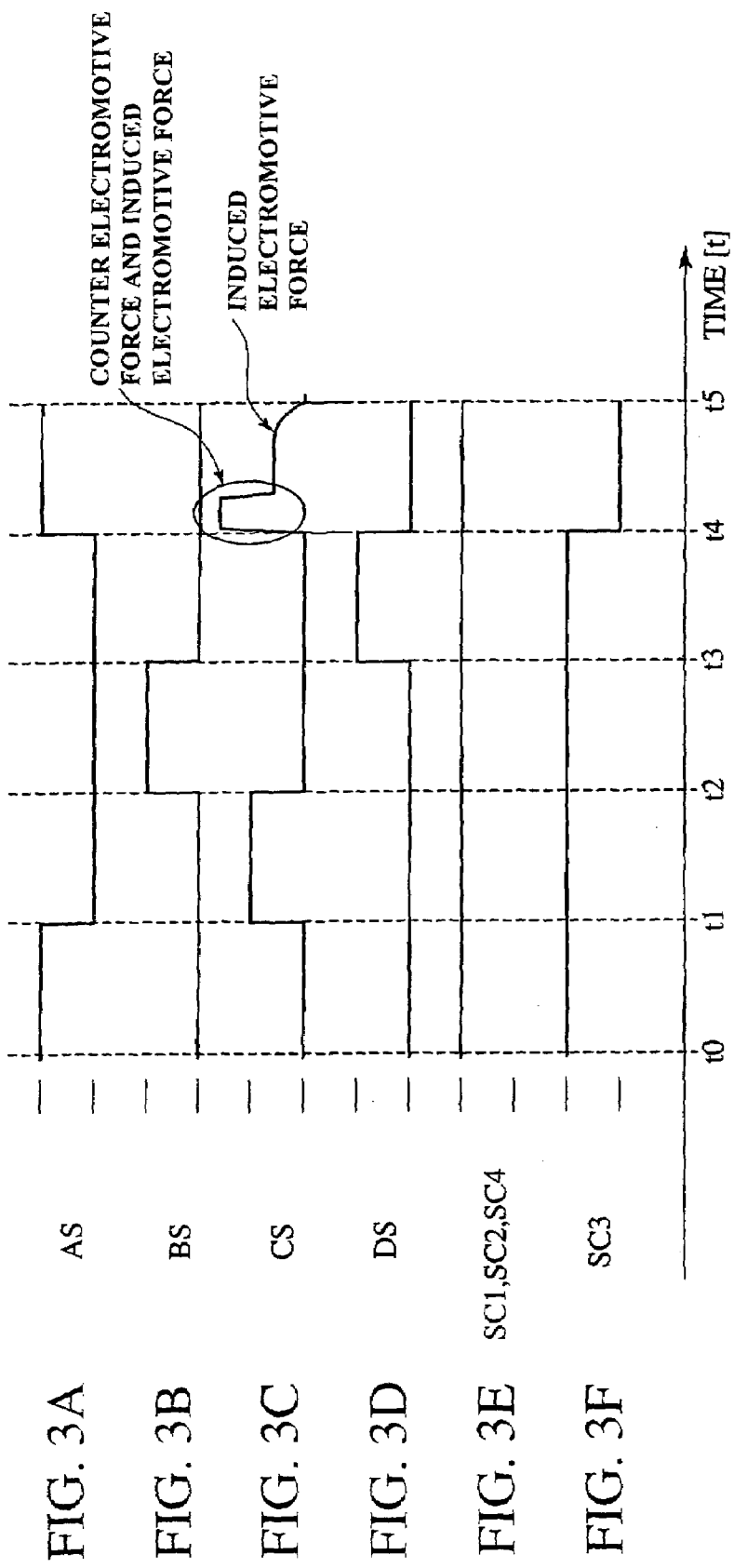
FIGS. 3A to 3F are time charts showing an operation of a motor controller according to the first embodiment of the present invention.

(A) In step S101 shown in FIG. 2, the drive controller 3c shown in FIG. 1 drives the stepping motor 17. The dipole rotator 13 rotates counterclockwise by 90° angles during the period of time t0 to t1 shown in FIGS. 3A to 3D. The dipole rotator 13 rotates counterclockwise by 90° angles also during the periods of time t1 to t2, t2 to t3, and t3 to t4. As shown in FIG. 3E, the first switching control signal SC1, the second switching control signal SC2, the third switching control signal SC3, and the fourth switching control signal SC4 are respectively set to be at a high level during the periods of time t0 to t4. Next, the drive controller 3c shown in FIG. 1 transmits the driving control signal SCPU, which allows the third buffer 42c to be in a high-impedance state, to the output controller 41. As a result, the output controller 41 renders the third switching control signal SC3 to a low level at the time t4 shown in FIG. 3F, and switches the third buffer 42c to a high-impedance state.

(B) Next, in step S102 of FIG. 2, the voltage measuring circuit 2a measures the voltage value of a combined force of the counter electromotive force and the induced electromotive force from the second inductor L2. Herein, the counter electromotive force is generated when energy stored in the second inductor L2 during the period of time t3 to t4 shown in FIG. 3C is released. Furthermore, the following equation (1) is established.

$$E = L(di/dt) \quad (1)$$

where "L" is inductance of the second inductor L2, "i" is current flowing through the second inductor L2, "t" is time when the current "i" flows, and "E" is a voltage value of the counter electromotive force generated by the second inductor L2. On the other hand, the induced electromotive force is generated by electromagnetic induction within the stepping motor 17. The voltage value of the combined force of the counter electromotive force and the induced electromotive force measured by the voltage measuring circuit 2a are transmitted to the CPU 3 as a voltage value signal SV.

Figure 4:
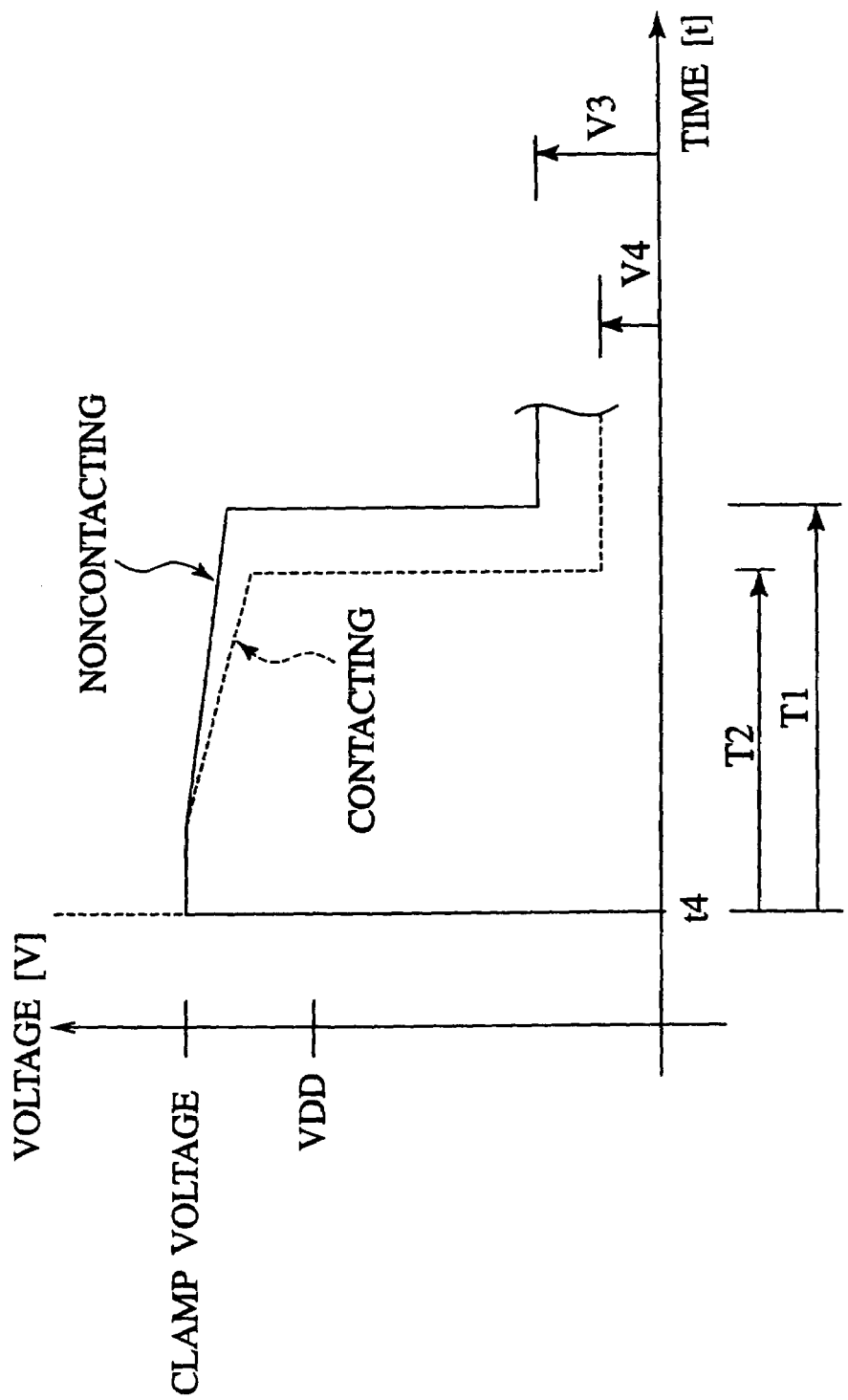
FIG. 4 is a magnified view of the circled counter electromotive force and induced electromotive force shown in FIG. 3C.

(C) Next, in step S103, the voltage difference calculator 3a shown in FIG. 1 performs the difference processing for the voltage value of the combined force of the counter electromotive force and the induced electromotive force. The voltage value of the counter electromotive force is very large compared to the voltage value of the induced electromotive force as shown in FIG. 3C. As shown in the period of time t4 to t5 of FIG. 3C, the induced electromotive force is generated by a relative position change between the second inductor L2 and the dipole rotator 13 shown in FIG. 1 also while the counter electromotive force is generated. As shown in FIG. 4, when the voltage value of the combined force of the counter electromotive force and the induced electromotive force are represented by V3 at the time the pointer 12 shown in FIG. 1 does not contact the zero position bar 14, the combined force V3 is compared with a first threshold Vth (V4<Vth<V3). That is, the following equation (2) is calculated.

$$\Delta V1 = |Vth - V3| \quad (2)$$

On the other hand, when the voltage value of the combined force of the counter electromotive force and the induced electromotive force are represented by V4 at the time the pointer 12 contacts the zero position bar 14, the combined force V4 is compared with the first threshold Vth, i.e., the following equation (3) is calculated.

$$\Delta V2 = |Vth - V4| \quad (3)$$

where $\Delta V2$ is a second voltage difference that is the voltage difference between the voltage values V2 and V4. Note that the fifth diode D5 shown in FIG. 1 controls the voltage of the counter electromotive force equal to or more a than clamp voltage as shown in FIG. 4.

(D) Next, in step S104 shown in FIG. 2, the voltage difference calculator 3a determines the comparison result of the first and second voltage differences $\Delta 1$ and $\Delta 2$ determined in step S103 with the first threshold Vth. Herein, the first threshold Vth is set to, for example, $\Delta V1 < 0 < \Delta 2$. The threshold comparator 3b shown in FIG. 1 judges whether the first and second voltage differences $\Delta 1$ and $\Delta 2$ determined in step S103 are equal to the first threshold Vth or more. When it is determined that the first and second voltage differences $\Delta 1$ and $\Delta 2$ are greater than the first threshold Vth, the procedure returns to step S101. When it is determined that the first and second voltage differences $\Delta 1$ and $\Delta 2$ are equal to or smaller than the first threshold Vth, the procedure advances to step S105, and it is determined that the zero position is detected.

As described above, since the zero position of the stepping motor 17 is detected by use of not only the induced electromotive force but also the counter electromotive force in the motor controller 1a according to the first embodiment, it is possible to detect the zero position with high precision. Accordingly, the pointer 12 of the indicating instrument according to the first embodiment can accurately indicate a zero position in spite of the occurrence of vibrations, the loss of synchronism and the like of the stepping motor 17.

Figure 5:
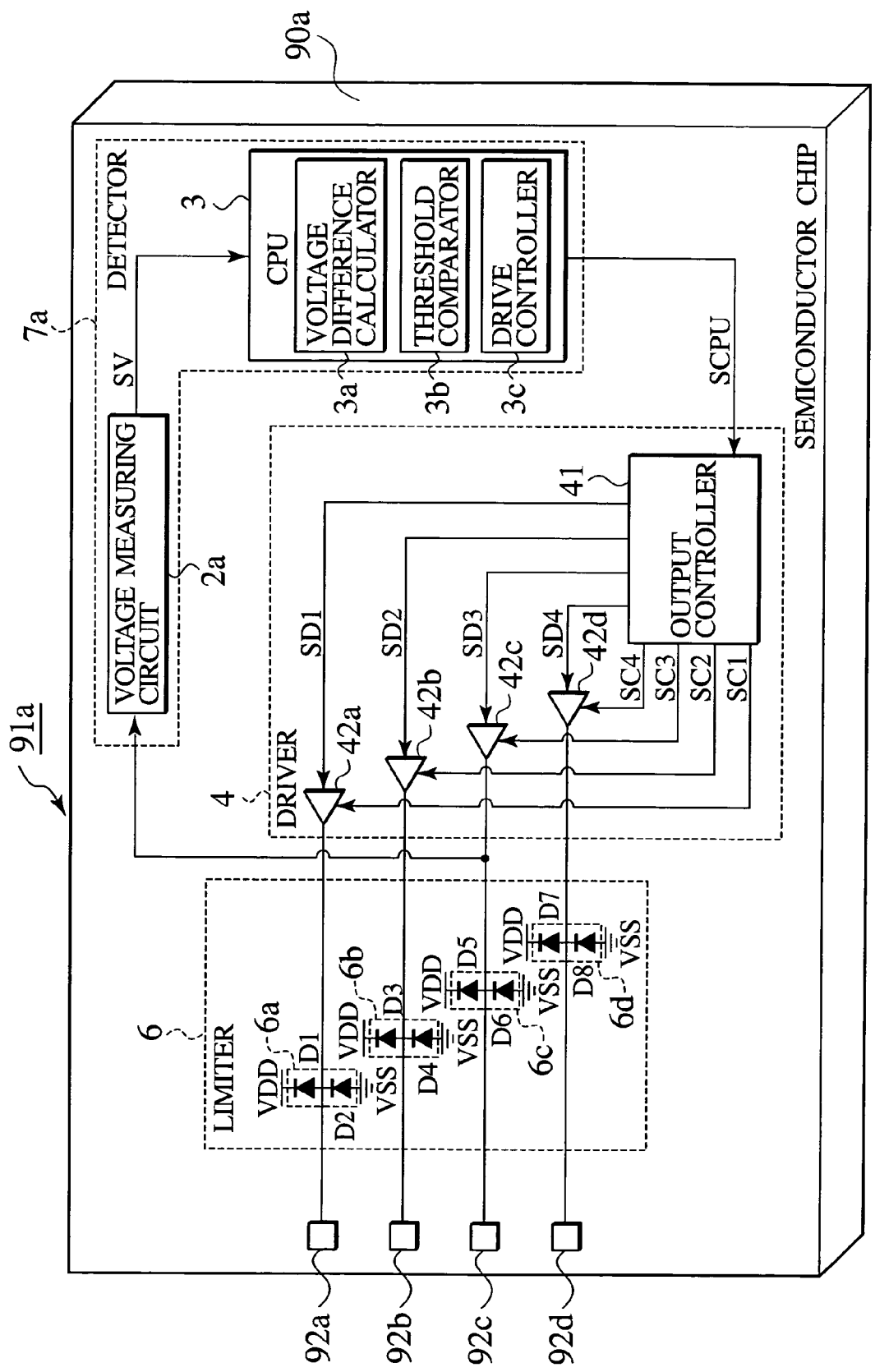
FIG. 5 is a schematic view showing a configuration integrated the motor controller according to the first embodiment of the present invention monolithically on the same semiconductor chip.

The voltage measuring circuit 2a, the CPU 3, the output controller 41, and the first to eighth diodes D1 to D8 can be monolithically integrated on a single semiconductor chip 90a, as shown in FIG. 5 for example, and a semiconductor integrated circuit 91a can be formed. In the example shown in FIG. 5, the semiconductor integrated circuit 91a further includes bonding pads 92a to 92d on the semiconductor chip 90a. The bonding pad 92a is an internal terminal for transmitting the first excitation signal SA supplied from the first buffer 42a to an external region. Similarly, the bonding pads 92b, 92c and 92d are internal terminals for respectively transmitting the second, third and fourth excitation signals BS, CS and DS supplied from the second, third and fourth buffers 42b, 42c and 42d to an external region. More specifically, the bonding pads 92a to 92d are connected to, for example, a plurality of high impurity concentration regions (source region/drain region) formed in and at the surfaces of active area assigned to the surface of the semiconductor chip 90a, where a donor or an acceptor is doped with a concentration of approximately $1 \times 10^{18}$ to $1 \times 10^{21}$ $cm^{-3}$. A plurality of electrode layers made from a metal such as aluminum (Al) or an aluminum alloy (Al—Si, Al—Cu—Si) are formed so as to implement ohmic contacts with the plurality of high impurity concentration regions. On the top surface of such a plurality of electrode layers, a passivation film such as an oxide film ($SiO_2$), a phosphosilicate glass (PSG) film, a boro-phosphosilicate glass (BPSG) film, a nitride film ($Si_3N_4$), or a polyimide film, is deposited.

A plurality of openings (contact holes) are delineated in a portion of the passivation film so as to expose a plurality of electrode layers, implementing the bonding pads 92a to 92d. Alternatively, the bonding pads 92a to 92d may be formed as other metal patterns connected to a plurality of electrode layers by using metal wiring. In addition, it is possible to form bonding pads 92a to 92d on the polysilicon gate electrodes using a metal film such as aluminum (Al) or an aluminum alloy (Al—Si, Al—Cu—Si). Alternatively, a plurality of other bonding pads may be connected, via a plurality of signal lines such as gate wirings, to the polysilicon gate electrodes. Instead of polysilicon, gate electrodes made of a refractory metal such as tungsten (W), titanium (Ti), or molybdenum (Mo), a silicide (i.e. $WSi_2$, $TiSi_2$, $MoSi_2$), or a polycide containing any of these suicides can be used.

Second Embodiment

Figure 6:
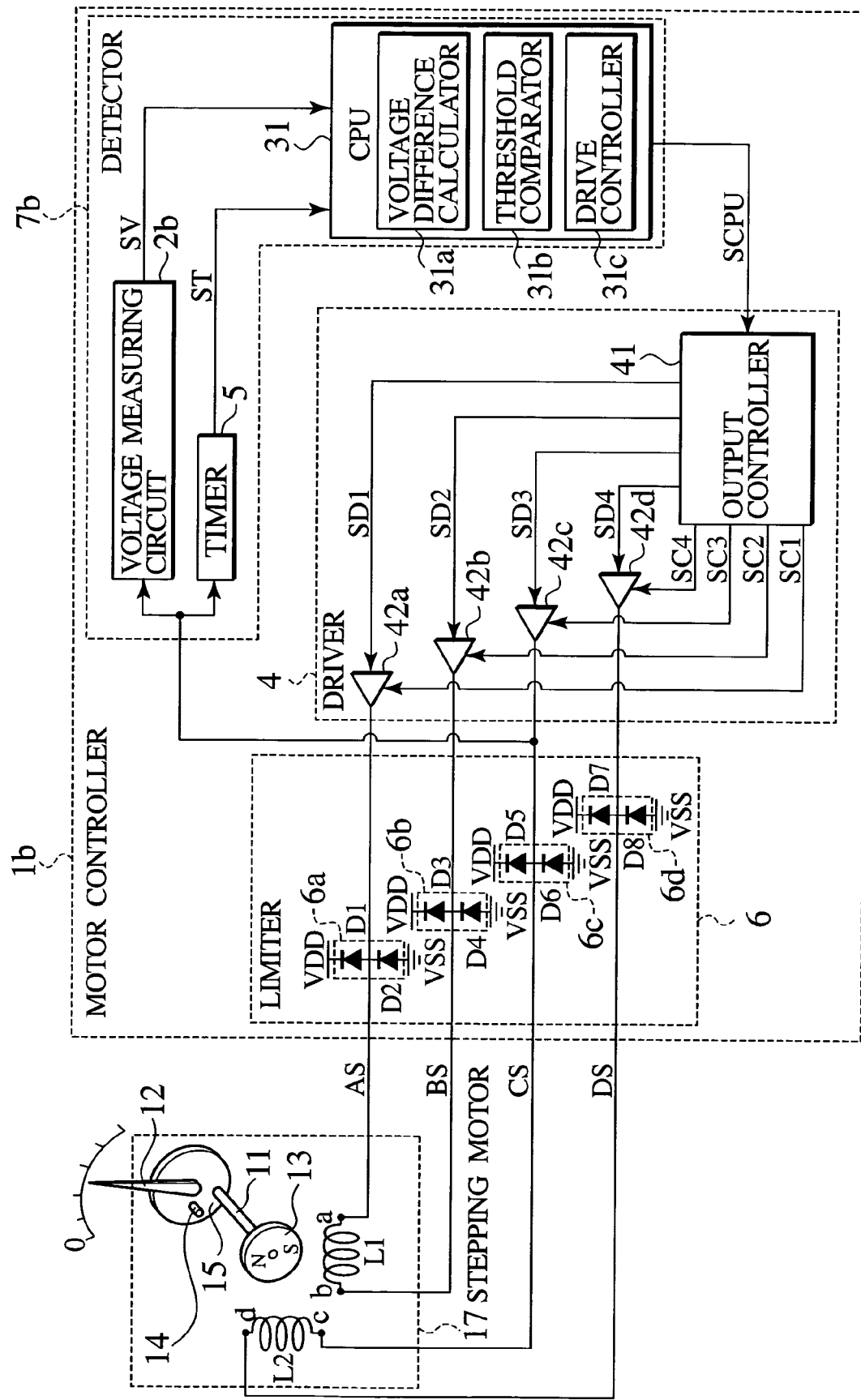
FIG. 6 is a block diagram showing an indicating instrument according to a second embodiment of the present invention.
Figure 7:
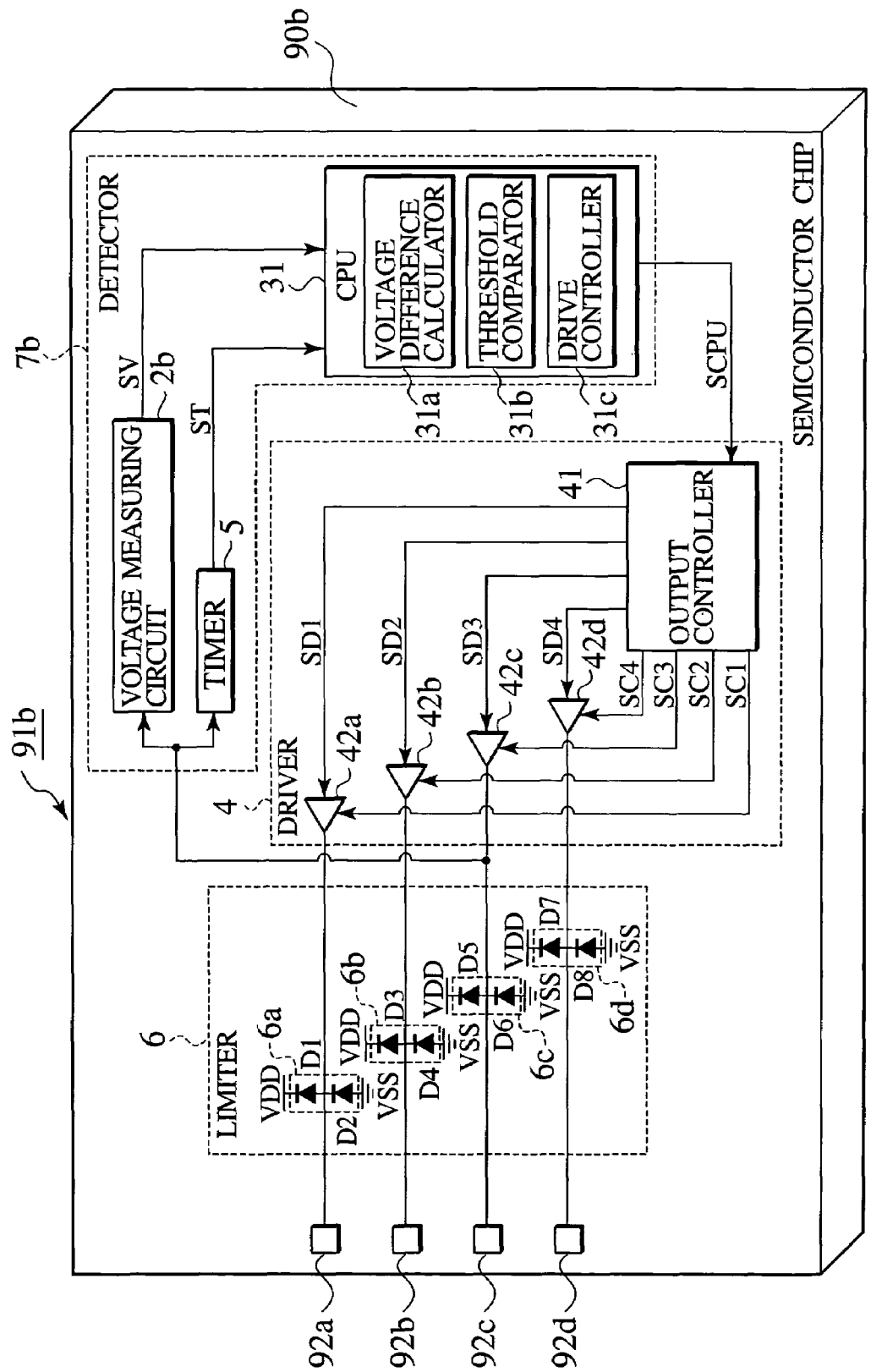
FIG. 7 is a schematic view showing a configuration integrated the motor controller according to the second embodiment of the present invention monolithically on the same semiconductor chip.

An indicating instrument according to a second embodiment of the present invention differs from the motor controller 1a shown in FIG. 1 in that a timer 5 is connected to the CPU 31 in parallel with the voltage measuring circuit 2b as shown in FIG. 6. The timer 5 measures the period forming voltage of the counter electromotive force. A second threshold Tth is further set in the threshold comparator 31b of the CPU 31. The indicating instrument according to the second embodiment has the same constitution as that of the indicating instrument shown in FIG. 1 except for the provision of the timer 5. As shown in FIG. 7, the motor controller 1b shown in FIG. 6 can be constituted as a semiconductor integrated circuit 91b by monolithically integrating the constituent components of the motor controller 1b on a semiconductor chip 90b.

Next, a method for controlling a motor according to the second embodiment of the present invention will be described by use of FIGS. 3, 4, 6 and 8. Repeated descriptions for the same operations of the motor control method according to the second embodiment which are the same as the first embodiment of the present invention are omitted.

Figure 8:
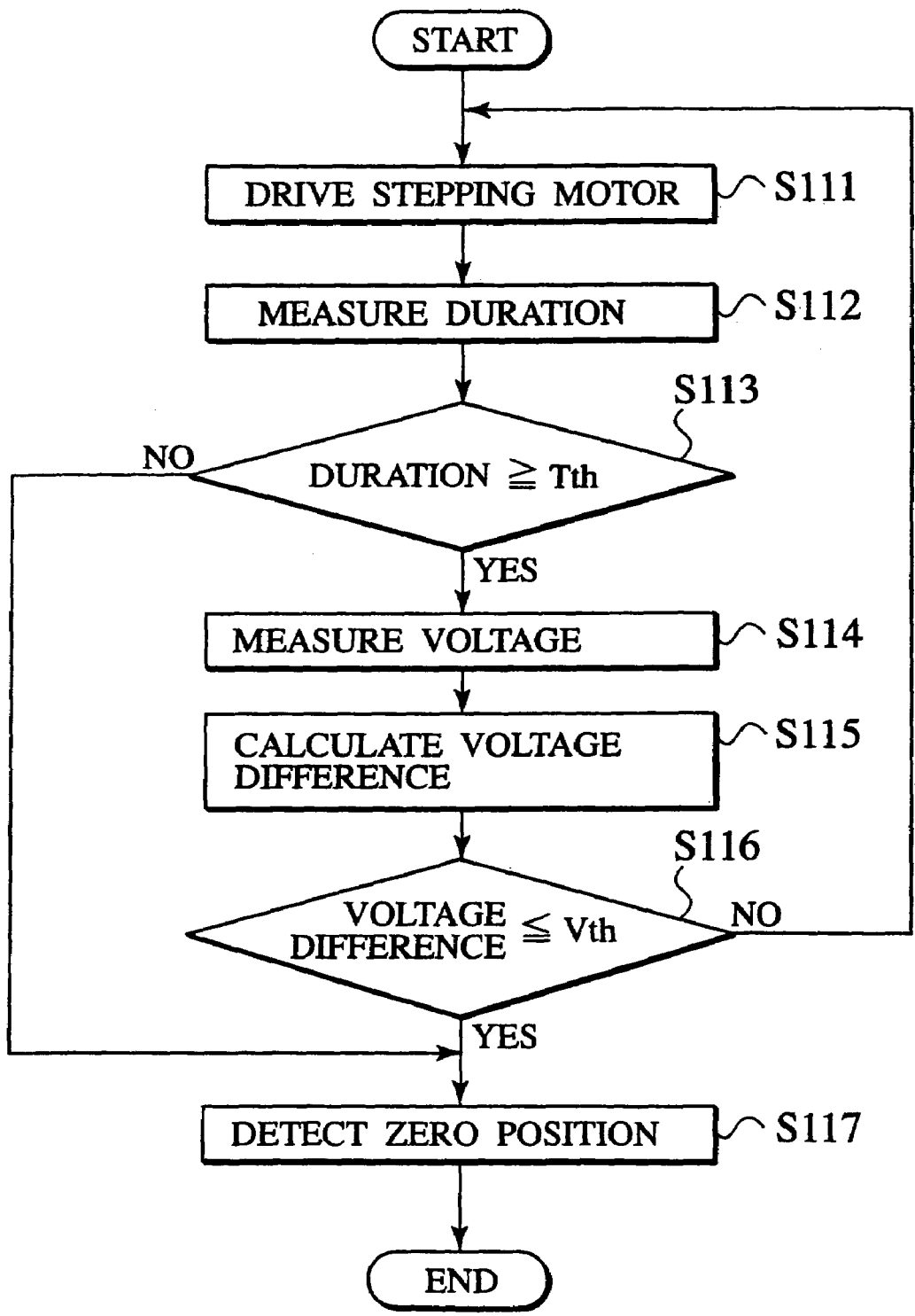
FIG. 8 is a flowchart showing a motor control method according to the second embodiment of the present invention.

(A) First, in step S111 shown in FIG. 8, the drive controller 31c shown in FIG. 6 drives the stepping motor 17. Subsequently, as shown in FIG. 3F, the output controller 41 renders the third switching control signal SC3 to a low level at the time t4, and switches the third buffer 42c to a high-impedance state.

(B) Next, in step S112, the timer 5 shown in FIG. 6 measures the period of forming voltage of the combined force of from the second inductor L2. The period forming voltage measured by the timer 5 is supplied to the CPU 31 as a time signal ST. Herein, as shown in FIG. 4, the period forming voltage of the counter electromotive force at the time the pointer 12 in FIG. 6 makes contact with the zero position bar 14 is represented as T2. The period forming voltage of the counter electromotive force at the time the pointer 12 does not make contact with the zero position bar 14 is represented as T1.

(C) Next, in step S113, the threshold comparator 31b shown in FIG. 6 compares the period forming voltage of the combined force with the second threshold Tth. The second threshold Vth is set to, for example, T2<Tth<T1. When it is determined that the periods forming voltage T1 and T2 are less than the second threshold Tth, the procedure advances to step S114. When it is determined that the periods forming voltage T1 and T2 are equal to or greater than the second threshold Tth, the procedure advances to step S117, and it is determined that the zero position is detected.

(D) Subsequently, in step S114, the voltage measuring circuit 2b shown in FIG. 6 measures the combined force of the voltage values of the counter electromotive force and the induced electromotive force from the second inductor L2. Furthermore, in step S115, the voltage difference calculator 31a performs the difference processing for the combined force of the counter electromotive force and the induced electromotive force, and calculates the voltage differences $\varDelta 1$ and $\varDelta 2$.

(E) Next, in step S116, the threshold comparator 31b shown in FIG. 6 compares the voltage differences $\varDelta 1$ and $\varDelta 2$, which were determined in step S115, with the first threshold Vth. When it is determined that the voltage differences $\varDelta 1$ and $\varDelta 2$ are greater than the first threshold Vth, the procedure returns to step S111. When it is determined that the voltage differences $\varDelta 1$ and $\varDelta 2$ are equal to or smaller than the first threshold Vth, the procedure advances to step S117, and it is determined that the zero position is detected.

As described above, according to the second embodiment, it is possible to detect the zero position of the stepping motor 17 by utilizing the period forming voltage of the combined force. Accordingly, the zero position can be detected at the end of the period of time when the counter electromotive force has been generated. Moreover, the zero position can be detected with extremely high precision by use of the period forming voltage of the combined force of the counter electromotive force and the combined force of the counter electromotive force and the induced electromotive force.

Third Embodiment

Figure 9:
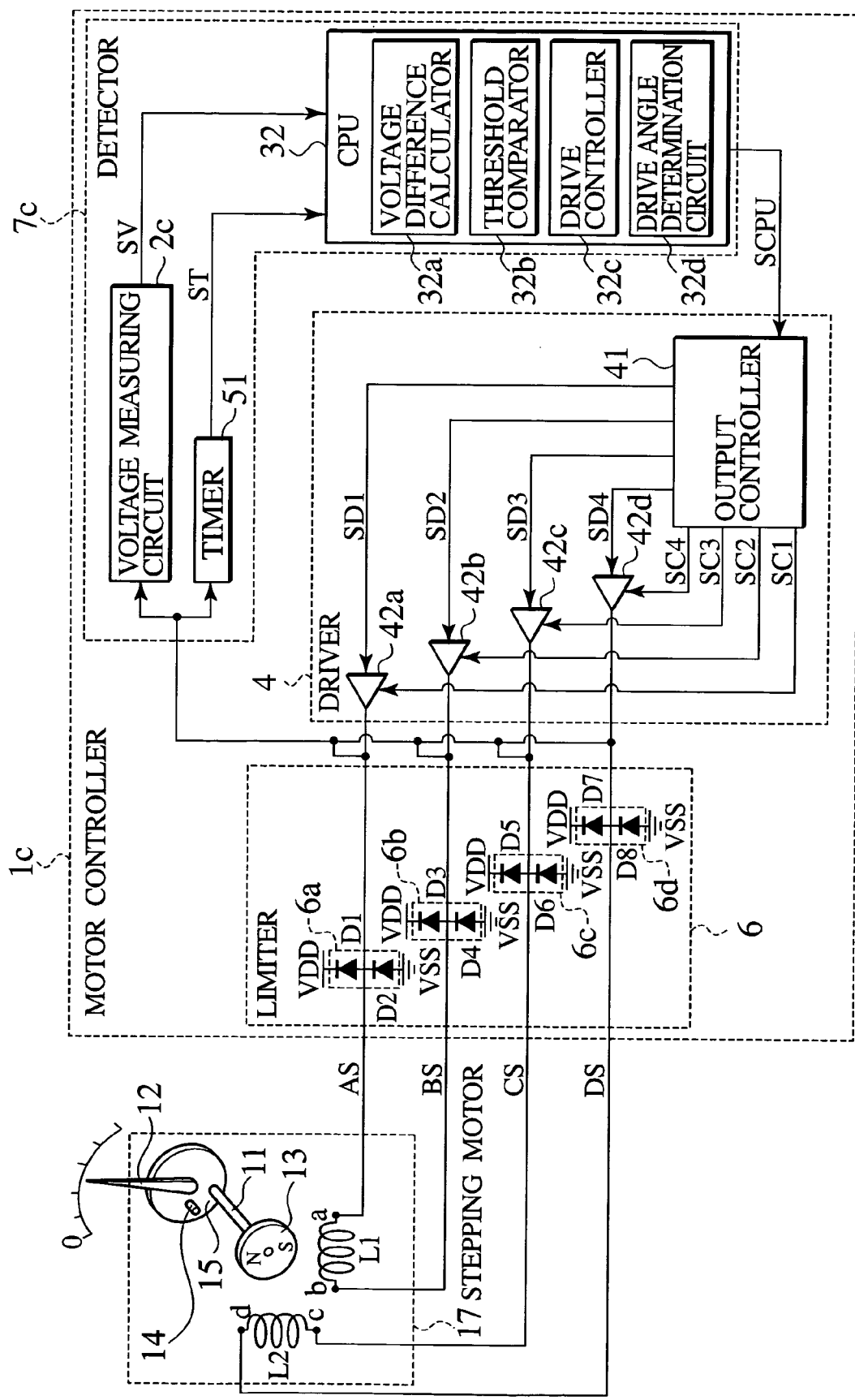
FIG. 9 is a block diagram showing an indicating instrument according to a third embodiment of the present invention.
Figure 10:
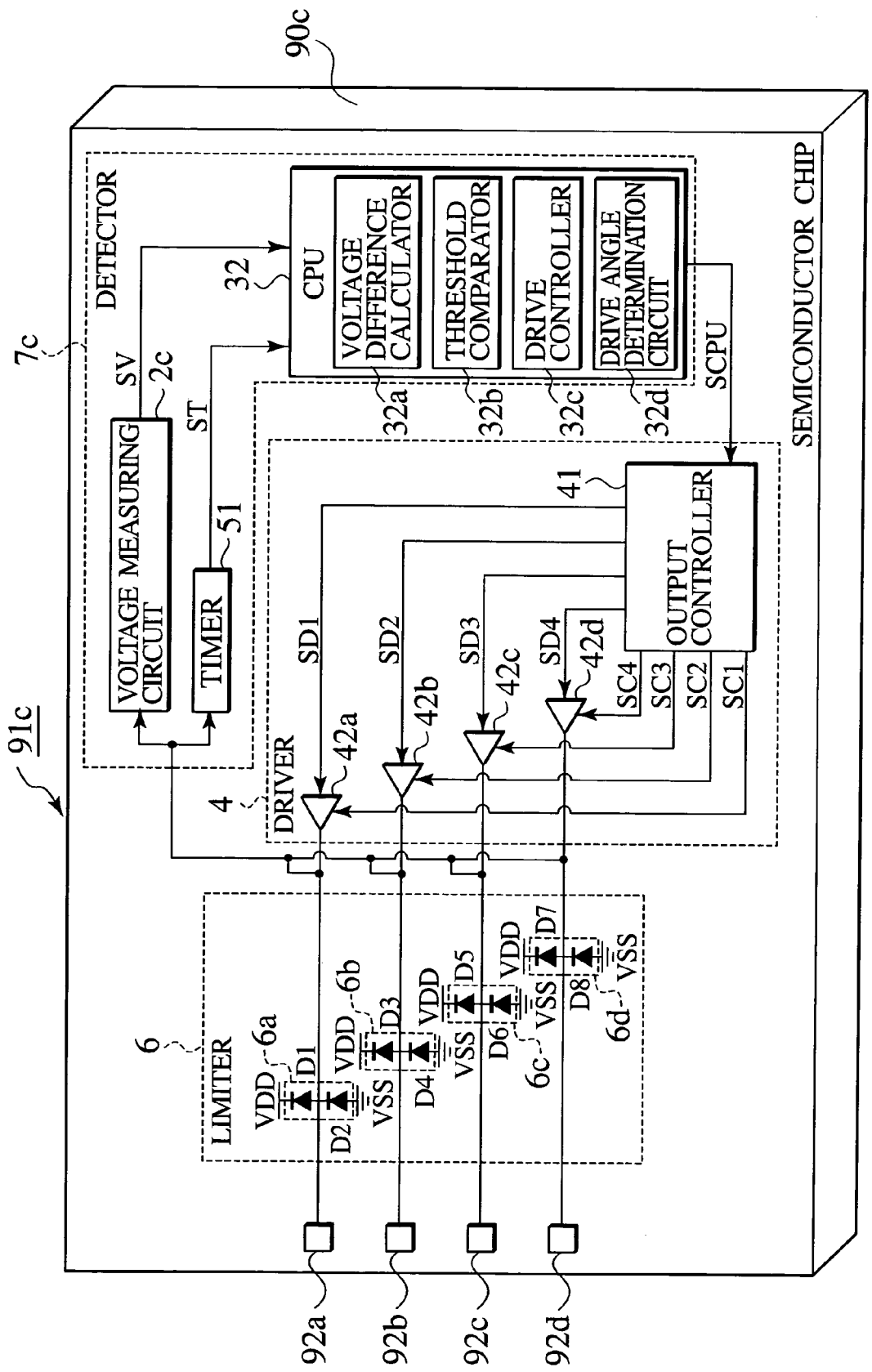
FIG. 10 is a schematic view showing a configuration integrated the motor controller according to the third embodiment of the present invention monolithically on the same semiconductor chip.

An indicating instrument according to a third embodiment of the present invention differs from the CPU 3 shown in FIG. 1 in that CPU 32 shown in FIG. 9 includes a drive angle determination circuit 32d configured to judge a drive angle at which the stepping motor 17 should be driven. The detector 7c is connected to outputs of the first buffer 42a, the second buffer 42b, the third buffer 42c, and fourth buffer 42d. The timer 51 is connected to the CPU 32 in parallel with the voltage measuring circuit 2c. The indicating instrument according to the third embodiment has the same constitution as that of the indicating instruments shown in FIG. 1 and FIG. 6 except for the provision of the drive angle determination circuit 32d. As shown in FIG. 10, the motor controller 1c shown in FIG. 9 can be constituted as a semiconductor integrated circuit 91c by monolithically integrating the constituent components of the motor controller 1c on a semiconductor chip 90c.

Figure 11A:
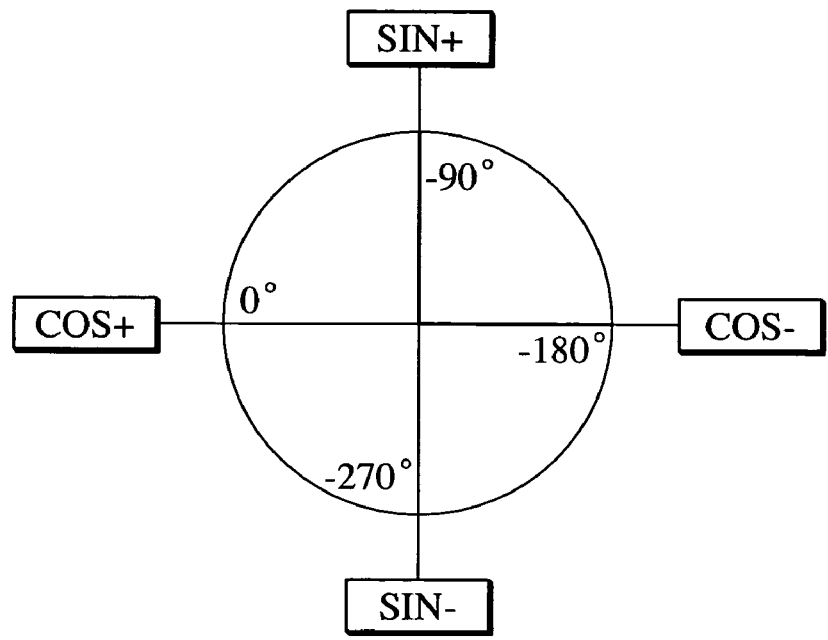
FIGS. 11A and 11B are drawings showing a principle of the motor controller according to the third embodiment of the present invention.
Figure 11B:
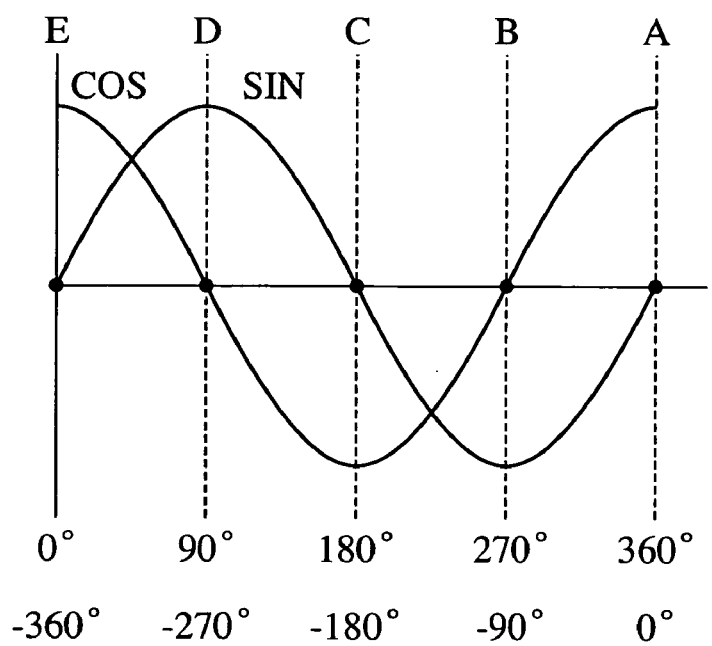
Figures 12A, 12B, 12C, 12D:
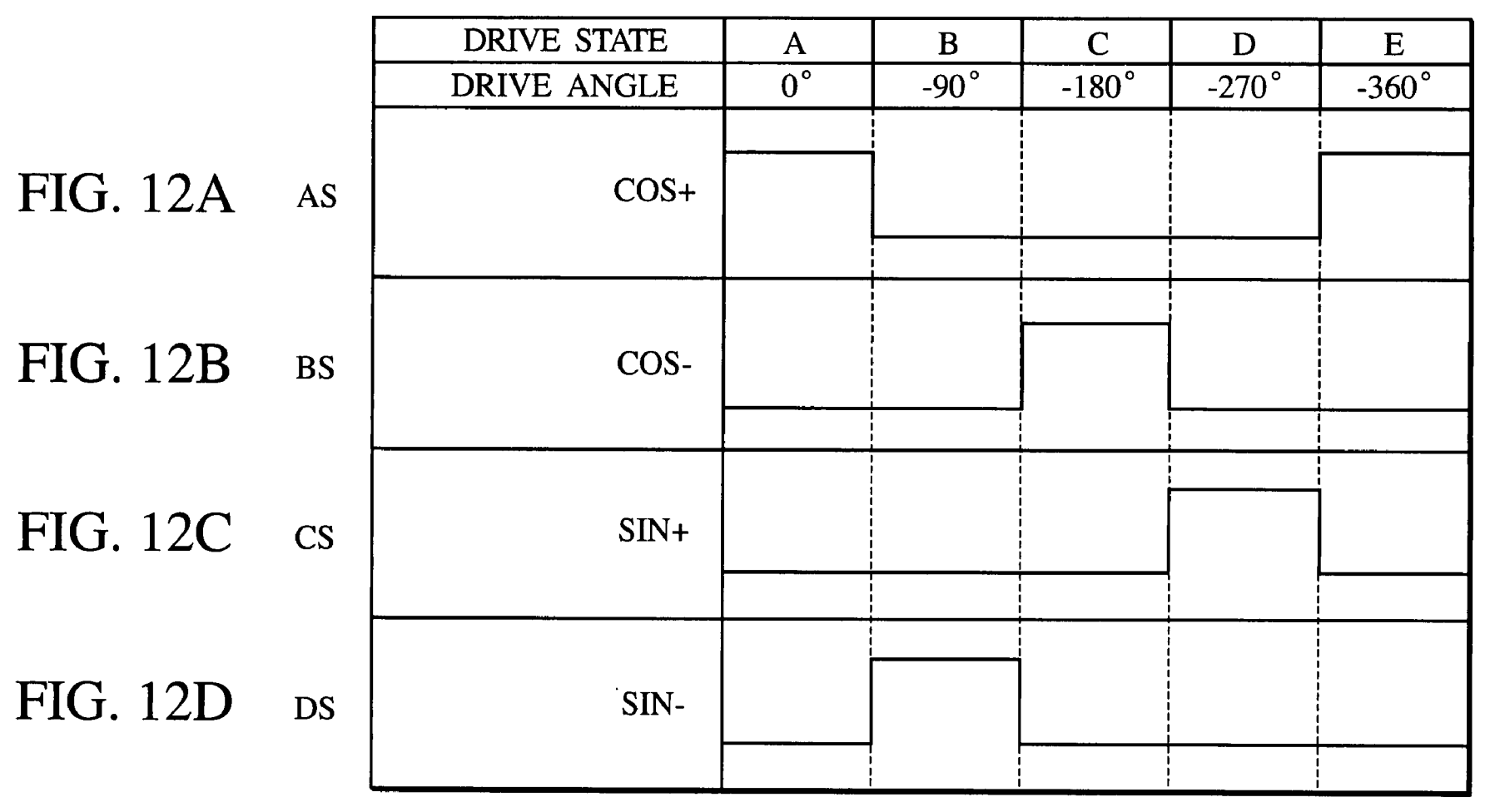

It is assumed that the output controller 41 shown in FIG. 9 rotatively drives the dipole rotator 13 at intervals of −90°, as shown in FIG. 11. Herein, when the drive angle of the dipole rotator 13 is 0°, −90°, −180°, −270°, and −360°, as shown in FIG. 11B and FIG. 12, the states of the dipole rotator 13 are represented as drive states A, B, C, D, and E respectively. The drive states B, C, D, and E shown in FIG. 11B represent a drive state in which only one of the first and second inductors L1 and L2 shown in FIG. 9 is excited. Furthermore, as shown in FIG. 12, the drive states A, C and E represent a drive state in which only the first inductor L1 is excited. The drive states B and D, as shown in FIG. 12, represent a drive state in which only the second inductor L2 is excited. The drive angle determination circuit 32d shown in FIG. 9 judges whether the drive state in which each of the first and second inductors L1 and L2 is excited is a drive angle at which the stepping motor 17 should be driven.

Next, a motor control method according to the third embodiment of the present invention will be described by use of FIGS. 3, 9, and 11 to 14. However, it is assumed that the output controller 41 shown in FIG. 9 rotatively drives the dipole rotator 13 at intervals of −90°. Repeated descriptions for the same operations of the motor control method according to the third embodiment which are same as the first and second embodiments of the present invention are omitted.

Figure 13:
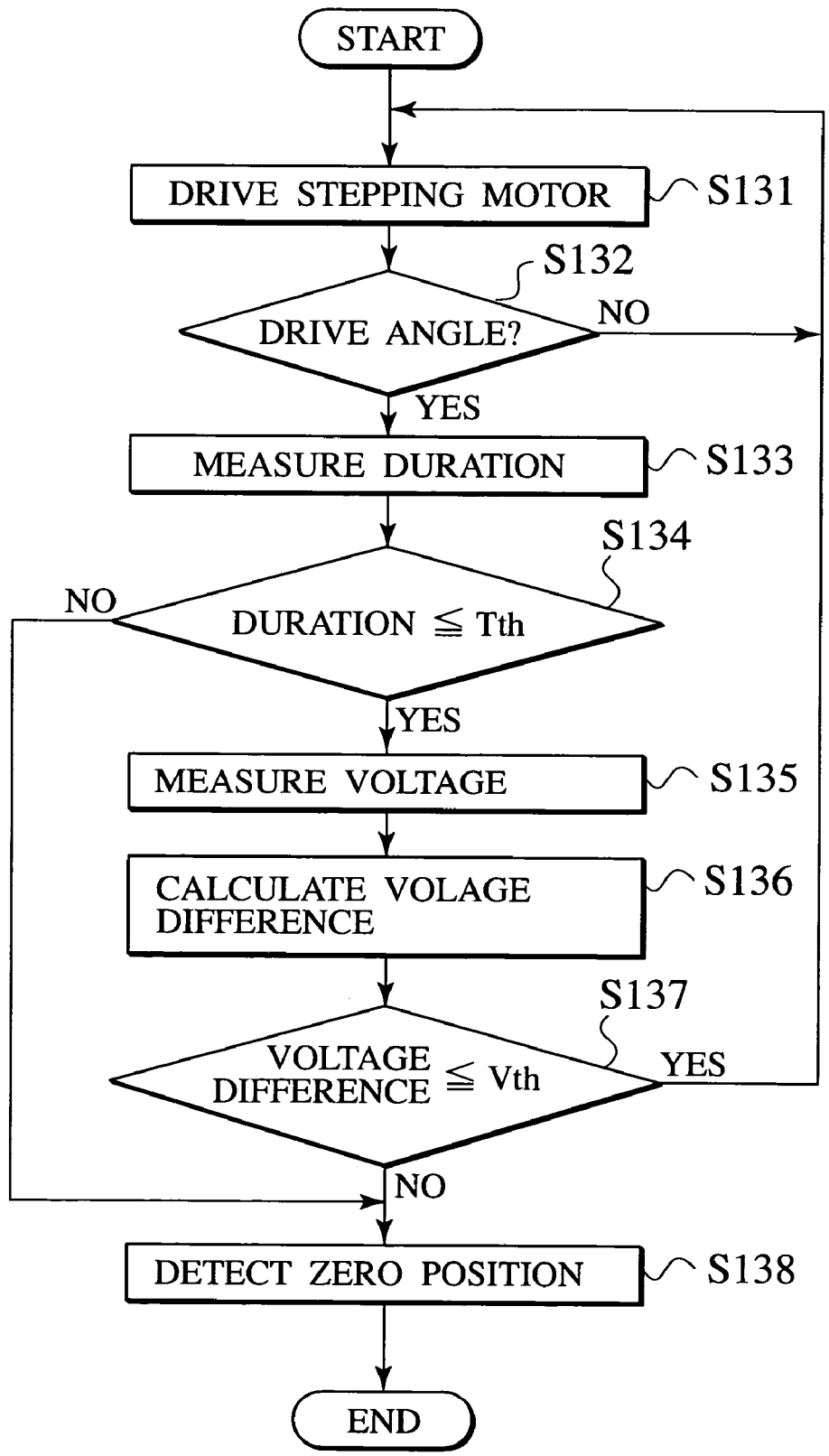
FIG. 13 is a flowchart showing a motor control method according to the third embodiment of the present invention.
Figure 14:
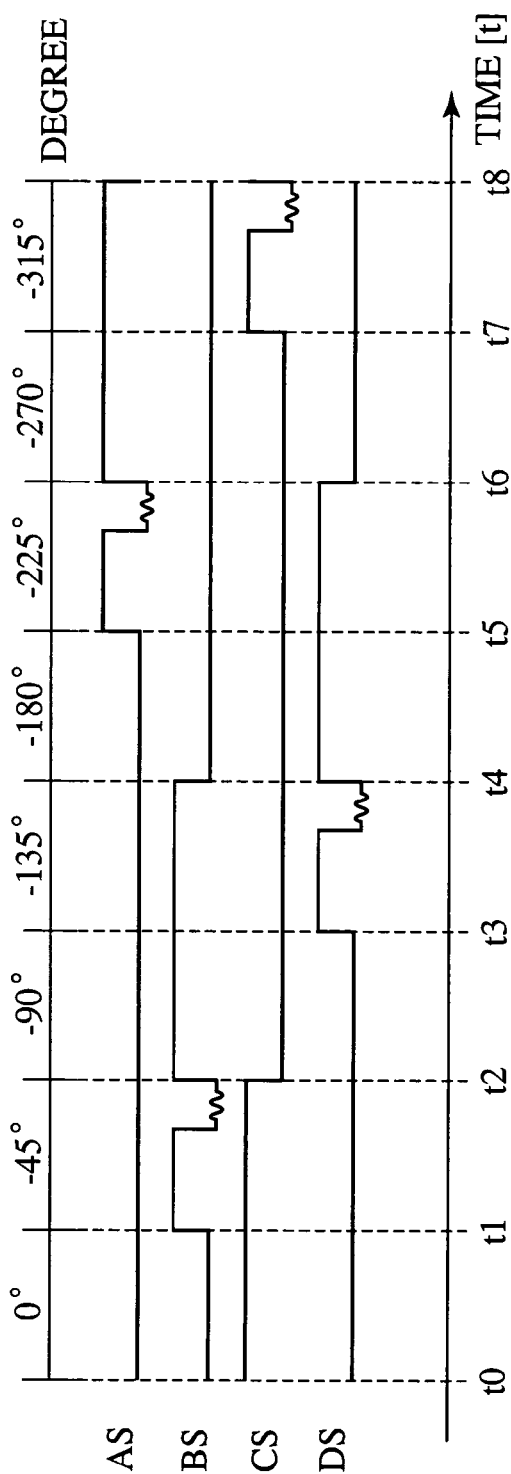
FIGS. 14A to 14D are time charts showing an operation of a motor controller according to the third embodiment of the present invention.

(A) To begin with, in step S131 shown in FIG. 13, the drive controller 32c shown in FIG. 9 drives the stepping motor 17. Subsequently, in step S132, the drive angle determination circuit 32d judges a drive angle at which the stepping motor 17 should be driven. As shown in FIGS. 14A, 14B, 14C, and 14D, the drive angles in which the first and second inductors L1 and L2 require drive are −45°, −135°, −225°, and −315°. When the drive angle determination circuit 32d determines that the drive angles do not require drive, the procedure returns to the step S131. On the other hand, when the drive angle determination circuit 32d determines that the drive angles require drive, the procedure advances to step S133.

(B) In step S133, the output controller 41 renders the second switching control signal SC2 to a low level at a part of the period of time t1 to t2 shown in FIG. 14B, and switches the second buffer 42b shown in FIG.9 to a high-impedance state. The output controller 41 renders the fourth switching control signal SC4 to a low level at a part of the period of time t3 to t4 shown in FIG. 14D, and switches the fourth buffer 42d to a high-impedance state. The output controller 41 renders the first switching control signal SC1 to a low level at a part of the period of time t5 to t6 shown in FIG. 14A, and switches the first buffer 42a to a high-impedance state. The output controller 41 renders the third switching control signal SC3 to a low level at a part of the period of time t7 to t8 shown in FIG. 14C, and switches the third buffer 42c to a high-impedance state. Moreover, the timer 51 shown in FIG. 9 measures the durations T1 and T2 of the counter electromotive force from the second inductor L2.

(C) Next, in step S134, the threshold comparator 32b shown in FIG. 9 compares the durations T1 and T2 of the counter electromotive force with the second threshold Tth. The second threshold Vth is set to, for example, T2<Tth<T1. When it is determined that the durations T1 and T2 are less than the second threshold Tth, the procedure advances to step S135. When it is determined that the durations T1 and T2 are equal to or greater than the second threshold Tth, the procedure advances to step S138, and it is determined that the zero position is detected.

(D) In step S135, the voltage measuring circuit 2c shown in FIG. 9 measures the voltage values of the counter electromotive force and the induced electromotive force from the second inductor L2. Furthermore, in step S136, the voltage difference calculator 32a performs the difference processing for the respective voltage values of the counter electromotive force and the induced electromotive force, and calculates the voltage differences ⊿1 and ⊿2.

(E) Next, in step S137, the threshold comparator 32b shown in FIG. 9 compares the voltage differences ⊿1 and ⊿2 determined in step S136 with the first threshold Vth. When it is determined that the voltage differences ⊿1 and ⊿2 are smaller than the first threshold Vth, the procedure returns to step S131. When it is determined that the voltage differences ⊿1 and ⊿2 are equal to or greater than the first threshold Vth, the procedure advances to step S138, and it is determined that the zero position is detected.

As described above, according to the third embodiment, since the drive angle determination circuit judges the drive angle at which the stepping motor 17 should be driven, it is possible to detect the zero position while the drive angle requiring the driving of the stepping motor.

OTHER EMBODIMENTS

Various modifications will become possible for those skilled in the art after receiving the teachings of the present disclosure without departing from the scope thereof.

Figure 15:
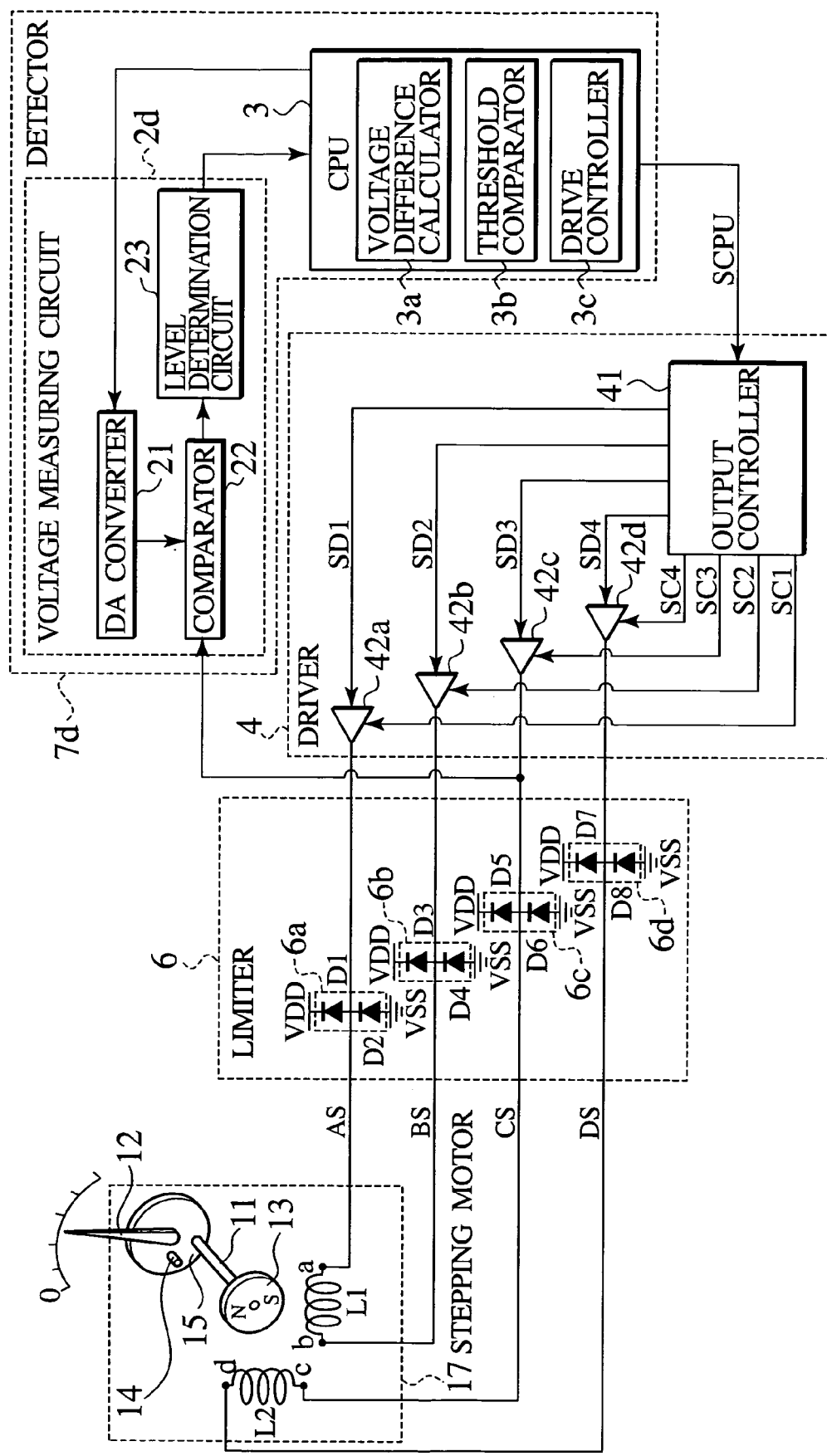
FIG. 15 is a block diagram showing an indicating instrument according to other embodiment of the present invention.

In the first to third embodiments which have been already described, the example in which the A/D converter is used as the voltage measuring circuit 2a has been described. However, as shown in FIG. 15, a voltage measuring circuit 2d may be used, which includes a D/A converter 21 connected to the CPU 3, a comparator 22 having one input terminal connected to the stepping motor 17 and the other terminal connected to the D/A converter 21, and a level determination circuit 23 connected between an output terminal of the comparator 22 and the CPU 3. The voltage measuring circuit 2d shown in FIG. 15 can control the voltage value of an analog signal by the CPU 3, the analog signal being outputted to the comparator 22 from the D/A converter 21. Accordingly, it is possible to detect the zero position with a high degree of freedom compared to the voltage measuring circuit 2a using the A/D converter.

In the foregoing first to third embodiments, the example has been described, in which the zero position of the stepping motor 17 is detected by use of the combined force of the counter electromotive force and the induced electromotive force, which are generated in the third excitation signal CS. However, it is obvious that the zero position of the stepping motor 17 can be detected by use of the combined force of counter electromotive force and an induced electromotive force which are generated in one of the first, second and fourth excitation signals AS, BS and DS.

In the first embodiment which has been described, the difference processing is performed for the combined force of the counter electromotive force and the induced electromotive force. In the second and third embodiments, the difference processing is performed for the combined force of the counter electromotive force and the induced electromotive force, and then the period forming voltage of the combined force is compared with the second threshold. However, an arrangement may be adopted, in which only the period forming voltage of the combined force is compared with the second threshold Tth.

Furthermore, in the foregoing first to third embodiments, the example has been described, in which the CPUs 3, 31 and 32 perform the difference processing for the combined force of the counter electromotive force and the induced electromotive force. When processing speeds of the CPUs 3, 31 and 32 are a problem, it is obvious that a logic circuit capable of executing a high speed operation by use of a subtracter, a comparator and the like instead of the CPUs 3, 31 and 32.

What is claimed is:

1. A motor controller for an indicating instrument including a pointer, a bar configured to secure the pointer at a fixed position, and a stepping motor configured to rotatively drive the pointer, comprising:
    a driver configured to drive the stepping motor, and to change one end of an inductor in the stepping motor to a high-impedance state;
    a timer configured to measure a duration of a combined force of a counter electromotive force and an induced electromotive force generated by the stepping motor, the counter electromotive force refers to power generated by energy stored in the inductor the induced electromotive force refers to power generated by a relative position change between the inductor and a rotator within the stepping motor; and
    a threshold comparator configured to compare the duration and a threshold, and to determine whether the pointer is contacted to the bar in accordance with a comparison result.

2. The motor controller of claim 1, further comprising a limiter connected between the stepping motor and the driver and configured to control overvoltage of the counter electromotive force.

3. The motor controller of claim 1, further comprising a drive controller configured to control driving of the stepping motor.

4. The motor controller of claim 3, further comprising a drive angle determination circuit configured to determine a drive angle at which the stepping motor should be driven.

5. A semiconductor integrated circuit for an indicating instrument including a pointer, a bar configured to secure the pointer at a fixed position, and a stepping motor configured to rotatively drive the pointer, comprising:
    a semiconductor chip;
    a driver integrated on the semiconductor chip and configured to drive the stepping motor, and to change one end of an inductor in the stepping motor to a high-impedance state;
    a timer integrated on the semiconductor chip and configured to measure a duration of a combined force of a counter electromotive force and an induced electromotive force generated by the stepping motor, the counter electromotive force refers to power generated by energy stored in inductors within the stepping motor, the induced electromotive force refers to power generated by a relative position change between the inductor and a rotator within the stepping motor; and
    a threshold comparator integrated on the semiconductor chip and configured to compare the duration and a threshold, and to determine whether the pointer is contacted to the bar in accordance with a comparison result.

6. An indicating instrument comprising:
    a stepping motor;
    a pointer rotatively driven by the stepping motor;
    a bar configured to secure the pointer at a fixed position;
    a driver configured to drive the stepping motor, and to change one end of an inductor in the stepping motor to a high-impedance state;
    a timer configured to measure duration of a combined force of a counter electromotive force and an induced electromotive force generated by the stepping motor, the counter electromotive force refers to power generated by energy stored in inductors within the stepping motor, the induced electromotive force refers to power generated by a relative position change between the inductor and a rotator within the stepping motor; and
    a threshold comparator configured to compare the duration and a threshold, and to determine whether the pointer is contacted to the bar in accordance with a comparison result.

7. A method for controlling a motor for an indicating instrument including a pointer, a bar configured to secure the pointer at a fixed position, and a stepping motor configured to rotatively drive the pointer, comprising:
    driving the stepping motor;
    changing one end of an inductor in the stepping motor to a high-impedance state;
    measuring a duration of a combined force of a counter electromotive force and an induced electromotive force generated by the stepping motor, the counter electromotive force refers to power generated by energy stored in inductors within the stepping motor, the induced electromotive force refers to power generated by a relative position change between the inductor and a rotator within the stepping motor;
    comparing the duration and a threshold; and
    determining whether the pointer is contacted to the bar in accordance with a comparison result.

* * * * *